United States Patent [19]

Bradshaw

[11] 4,207,167

[45] Jun. 10, 1980

[54] COMBINATION HYDROCARBON CRACKING, HYDROGEN PRODUCTION AND HYDROCRACKING

[75] Inventor: Ralph W. Bradshaw, Houston, Tex.

[73] Assignee: Phillips Petroleum Company, Bartlesville, Okla.

[21] Appl. No.: 888,719

[22] Filed: Mar. 21, 1978

[51] Int. Cl.² ............................ C10G 37/06; C01B 1/02
[52] U.S. Cl. .................................... 208/68; 208/108; 208/113; 252/418; 423/652; 423/655
[58] Field of Search ............... 208/68, 89, 97, 95; 252/418, 419, 420; 423/652, 655

[56] References Cited

U.S. PATENT DOCUMENTS

| | | | |
|---|---|---|---|
| 2,518,775 | 8/1950 | Guyer | 208/78 |
| 2,572,734 | 10/1951 | Kramer | 423/734 |
| 3,172,839 | 3/1965 | Kozlowski | 208/68 |
| 3,193,488 | 7/1965 | Carr | 208/68 |
| 3,245,900 | 4/1966 | Paterson | 208/68 X |
| 3,284,338 | 11/1966 | Patrick et al. | 208/68 |
| 3,691,063 | 9/1972 | Kirk | 208/91 |
| 3,816,298 | 6/1974 | Aldridge | 208/112 |
| 3,844,973 | 10/1974 | Stine et al. | 252/417 |
| 3,954,599 | 4/1976 | Ooka | 208/126 X |
| 4,039,429 | 8/1977 | Klinken et al. | 208/50 |

Primary Examiner—Delbert E. Gantz
Assistant Examiner—G. E. Schmitkons

[57] ABSTRACT

A used hydrocarbon cracking catalyst having coke laydown thereon is regenerated under conditions to produce a gas rich in carbon monoxide which, together with steam, is subjected to a shift reaction to produce carbon dioxide and hydrogen, and oil cracked with said catalyst produces vapors which are fractionated to yield gases, cracked gasoline, a light-cycle oil, a heavy-cycle oil and bottoms, at least one of the light and heavy cycle oils is hydrocracked with the hydrogen earlier produced.

2 Claims, 1 Drawing Figure

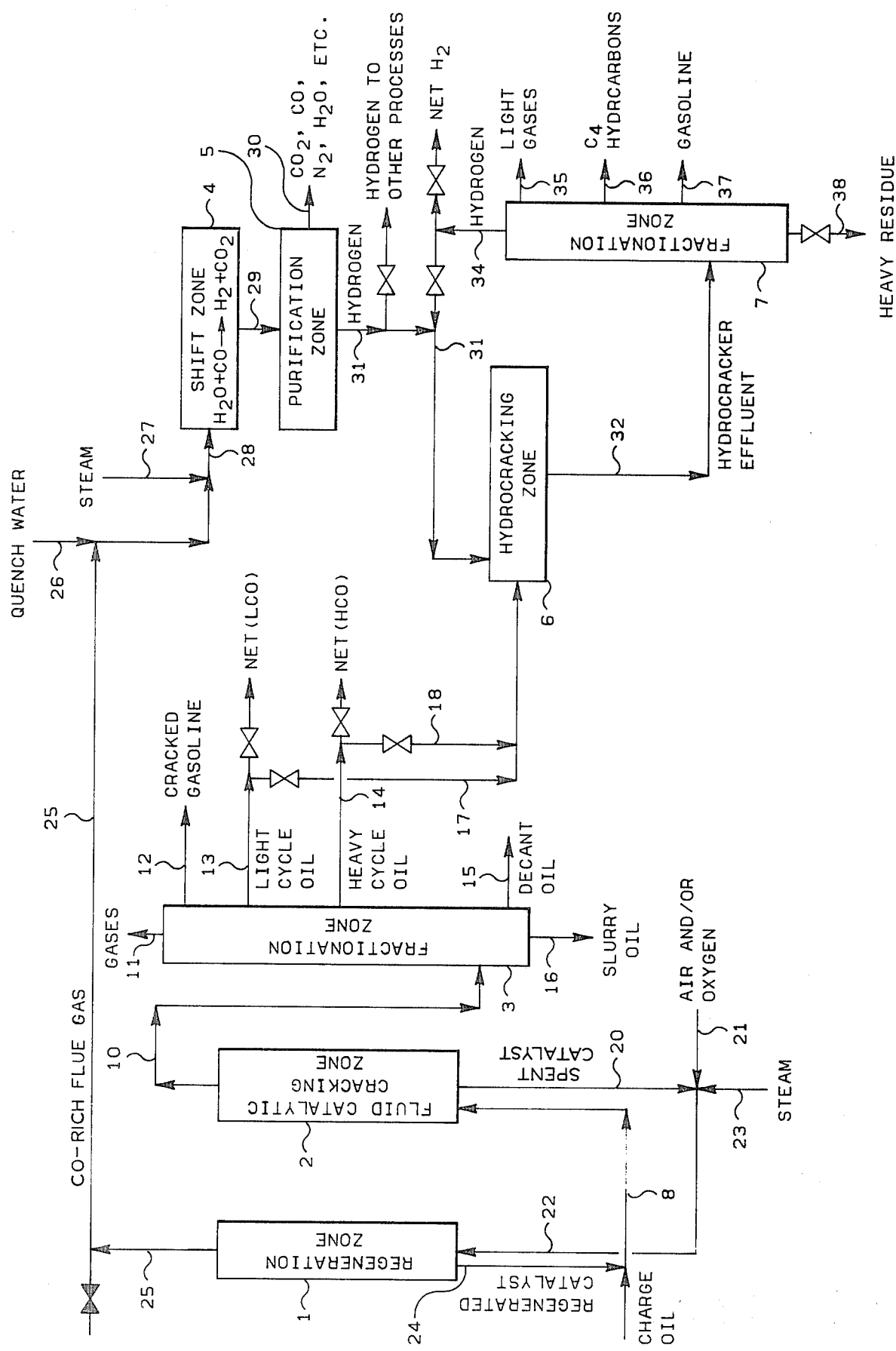

COMBINATION HYDROCARBON CRACKING, HYDROGEN PRODUCTION AND HYDROCRACKING

This invention relates to catalytic cracking of a hydrocarbon oil and to the hydrocracking of a fraction obtained in said cracking and to the production of hydrogen employing a water shift reaction to convert carbon monoxide to carbon dioxide and hydrogen. In one of its aspects the invention relates to a combination of operations neatly permitting the catalytic cracking of a hydrocarbon oil, the regeneration of used catalysts having coke laydown thereon, the production of hydrogen and the use of hydrogen thus obtained to hydrocrack at least one fraction resulting from said catalytic cracking of hydrocarbon oil.

In one of its concepts the invention provides in combination, steps as follow: catalytic cracking a hydrocarbon oil, regenerating catalyst used in said cracking under conditions to produce gases rich in carbon monoxide, effecting the water shift upon said gases to produce carbon dioxide and hydrogen, fractionating vapors obtained in said cracking of hydrocarbon oil to obtain, e.g., gases, cracked gasoline, a light-cycle oil, a heavy-cycle oil and a heavier fraction of hydrocarbons and hydrocracking at least one of said light and heavy cycle oil with hydrogen obtained in said water shift reaction.

There is a constant need for improved processes or steps in specific combinations to beneficiate in a better, more economical manner oil upon which this Country is increasingly dependent and which this Country increasingly imports. Imports from abroad are at or around the 45% figure at this time. While individual operations are also to be improved, combinations of individual operations which can be set forth to maximize useful products obtained from each barrel of oil and to minimize energy requirements, e.g., heating, cooling, pumping, etc., are also needed.

I have conceived a combination of steps which permits a better beneficiation of a hydrocarbon oil as further described herein.

It is an object of this invention to produce a hydrocracked oil. It is a further object of this invention to produce hydrogen for hydrocracking said oil. It is still a further object of the invention to provide a combination of steps wherein a hydrocarbon oil is cracked, a catalyst used in said cracking is regenerated and use is made of gases obtained in regeneration to produce hydrogen for hydrocracking of an oil. It is a further object of the invention to so combine certain steps or processes as to more efficiently process a hydrocarbon oil to produce gases, a cracked gasoline, a light-cycle oil, a heavy cycle oil and other fractions as well as hydrocracked oil products including gasolines and heavier hydrocarbon fractions as well as gases which may be desirably further converted, e.g., butanes, which can be dehydrogenated to butene and even to butadiene, useful in the production of various materials including synthetic rubbers or polymers.

Other aspects, concepts, objects and the several advantages of the invention are apparent from a study of this disclosure the drawing, and the appended claims.

According to the present invention there is provided a combination of process steps which comprises catalytically cracking a hydrocarbon oil, regenerating a used catalyst having coke laydown thereon, the regeneration being effected under conditions to produce a gaseous effluent containing carbon monoxide, subjecting said effluent to a water shift reaction producing carbon dioxide and hydrogen, fractionating cracked oil vapors earlier obtained to obtain among other fractions, a cycle oil and hydrocracking said cycle oil in the presence of the hydrogen earlier produced.

It will be evident to one skilled in the art in possession of this disclosure having studied the same that the combination disclosed is subject to some modification or variation. However, essentially, as can be seen, there is provided in one combination operation a number of steps which can be so combined as to effectively utilize not only the feed stock but also energy required to process the same.

The disclosures of the following patents are incorporated by reference: U.S. Pat. No. 2,518,775 issued Aug. 15, 1950, J. A. Guyer; U.S. Pat. No. 2,572,734 issued Oct. 23, 1951, B. R. Kramer; U.S. Pat. No. 3,172,839 issued Mar. 9, 1965, R. H. Kozlowski; U.S. Pat. No. 3,193,488 issued July 6, 1965, D. E. Carr; and U.S. Pat. No. 3,284,338 issued Nov. 8, 1966 to P. O. Patrick and John H. Engel.

The foregoing patents given cite the art to which the present invention relates.

The invention is now further described with the aid of the drawing in which there are represented a regeneration zone 1 and catalytic cracking zone 2, a fractionation zone 3, and water-shift reaction zone 4, a purification zone 5, a hydrocracking zone 6, and a final fractionation zone 7.

Further, referring to the drawing, a hydrocarbon oil cracking charge stock, as known in the art, is passed by 8 along with regenerated cracking catalyst 24 to catalytic cracking zone 2, from which vapors pass by transfer line 10 to fractionation zone 3. In zone 3 the usual fractionation is accomplished to produce gases taken off at 11 a cracked gasoline taken off at 12 a light and heavy cycle oil taken off at 13 and 14, respectively, a decant oil taken off at 15 and a slurry oil, which can be recycled to zone 2, taken off at 16. At least one of the light and heavy cycle oil or, optionally, a cycle oil fraction differently obtained is passed to hydrocracking 6 by 17 and/or 18, respectively.

Hydrocracking zone 6 may include a first or separate hydrodesulfurization zone in which $H_2S$ is also yielded and removed from the feed to hydrocracking.

Used or spent catalyst is withdrawn from catalytic cracking zone 2 by 20 and passed together with air or an oxygen-containing gas for oxygen supplied at 21 by 22 into regeneration zone 1. The conditions in regeneration zone 1 are controlled by the composition of the oxygen-containing regeneration gas and with steam supplied at 23 to produce a flue gas containing carbon monoxide which is passed by 25 together with quench water introduced at 26 to shift zone 4. If needed, reactant steam is introduced into the flue gas at 27. The quench water provides steam and is used also to adjust the temperature of the carbon monoxide-containing flue gas to prepare it for suitable water shift reaction in 4.

The effluent 29 from zone 4 is passed to a purification system 5 in which carbon monoxide, any nitrogen, sulfur dioxide, etc., are removed at 30. Hydrogen is passed by 31 to hydrocracking 6 wherein a cycle oil, as earlier described, is hydrocracked, and the hydrocracking effluent is passed by 32 to fractionation zone 7. In zone 7 fractionation yields hydrogen which can be yielded and/or recycled by 34, the usual light gases taken off at 35, C₄ hydrocarbons taken off at 36, gasoline taken off at 37, and heavier hydrocarbons, when present, withdrawn at 38.

The conditions in the several operations described are generally well known in the art. Optimum conditions for the operation of the combination here set forth can be selected by one skilled in the art in possession of this disclosure and having studied the same.

The following calculated information is given by way of a more complete description of the invention:

one fraction resulting from the cracking of said oil, the steps comprising in combination, cracking a hydrocarbon oil in the presence of a catalyst, producing cracked vapors, fractioning said vapors to produce a cycle oil, and hydrocracking said cycle oil with hydrogen obtained as follows: regenerating catalyst spent in said catalytic cracking of a hydrocarbon oil under conditions to produce a flue gas containing carbon monoxide, subjecting said gas to a water shift reaction producing carbon dioxide and hydrogen and recovering said hy-

| | | | | |
|---|---|---|---|---|
| | Catalyst Circulation, (20) and (24), Pounds/Hour, | | | 600,000 |
| (5) | Products Separation: | | | |
| | H₂, SCF/HR | | | 473,000 |
| | N₂, SCF/HR | | | 1,664,000 |
| | CO₂, SCF/HR | | | 638,500 |
| | CO, SCF/HR (recycled) | | | 25,000 |
| | H₂O (liquid), recycle to quench (26), g/hour | | | 300 |
| (6) | Hydrocracking Unit | Range | Specific | |
| | Pressure, psig., | 500–3000 | 1500 | |
| | Temperature, °F., | 500–900 | 750 | |
| | Space Velocity, V/V/Hr. | 0.5–10 | | |
| | Catalyst used: Conventional for Example: Nickel-Molybdenum, Cobalt-Molybdenum, etc. | | | |
| (17,18) | Hydrocarbon, Barrels/Hour (Cycle oil, API at 60 of 27) | | | 70 |
| (20) | Weight % Coke on Spent Catalyst, | | | 4.5 |
| (21) | Regeneration Air, SCF/Hour, | | | 2,080,000 |
| (23) | Steam to Regenerator, 250° F., Pounds/Hour | | | 24,700 |
| (24) | Weight % Coke on Regenerated Catalyst, (Regenerator at 20 psig., 1200° F.) | | | 1.0 |
| (25) | Flue Gas Yield | Wet Gas | Dry Gas | |
| | SCF/Hour, | 2,850,000 | 2,330,000 | |
| | Composition, Vol. %, | | | |
| | CO | 17.2 | 21.0 | |
| | CO₂ | 5.7 | 7.0 | |
| | N₂ (Plus) | 58.9 | 72.0 | |
| | H₂O Vapor | 18.2 | 0 | |
| | Total | 100.0 | 100.0 | |
| (26) | Quench Water, at 100° F., Gal./Hour, | | | 2,500 |
| (27) | Dilution Steam (700° F.), Pounds/Hour | | | 22,000 |
| (28) | Total Feed to Shift Zone at 700° F. Composition (Wet), Vol. % | | | |
| | CO | 15.0 | | |
| | CO₂ | 5.0 | | |
| | N₂ (Plus) | 50.1 | | |
| | H₂O (Vapor) | 29.9 | | |
| | Total | 100.0 | | |
| | SCF/Hour, | | | 3,322,000 |
| | H₂O/CO mol ratio, | | | 1.99 |
| (29) | Effluent from Shift Zone Composition, wet, Vol. % | | | |
| | CO | 0.8 | | |
| | CO₂ | 19.2 | | |
| | N₂(Plus) | 50.1 | | |
| | H₂ | 14.2 | | |
| | H₂O (Vapor) | 15.7 | | |
| | Total | 100.0 | | |
| | SCF/Hour | | | 3,322,000 |
| | Shift zone Pressure, psig., | | | 20 |
| | Shift zone Temperature, °F., | | | 700 |
| (31) | Hydrogen, SCF/Hour, | | | 300,000 |
| (32) | Hydrocracked Product (less than H₂) Barrels/Hour, | | | 87 |
| (35) | C₃ and lighter (less H₂) SCF/Hour | | | 6,720 |
| (36) | C₄ Hydrocarbons, Barrels/Hour, | | | 11 |
| (37) | 400° F., E.P. Gasoline, debutanized, Barrels/Hour | | | 76 |
| (38) | Residue, Barrels/Hour, | | | 0 |

Reasonable variation and modification are possible within the scope of the foregoing disclosure, drawing and the appended claims to the invention the essence of which is that there has been provided a combination of steps with which to crack a hydrocarbon oil, regenerate a catalyst, produce hydrogen and hydrocrack at least one drogen for use in said hydrocracking.

I claim:

1. A process for producing a hydrocracked oil which comprises in a cracking zone cracking a hydrocarbon oil in the presence of a catalyst, fractionating cracked vapors thus produced to obtain a cycle oil and hydrocracking said cycle oil in the presence of hydrogen obtained as follows: regenerating in a regenerator in said cracking zone spent catalyst as obtained from said cracking and having coke laydown thereon, under conditions to combust said coke to produce a flue gas containing carbon monoxide, recovering said flue gas from said regenerator, adding at least one of water and steam to quench said recovered flue gas and as needed to adjust the temperature of said flue gas and to provide steam reactant; in an ensuing water shift reaction, subjecting said recovered flue gas containing carbon monoxide and now containing steam to a water shift reaction to produce carbon dioxide and hydrogen recovering hydrogen from said water shift reaction product and using said hydrogen, thus obtained and recovered, for said hydrocracking of said cycle oil.

2. An operation according to claim 1 wherein the product of the hydrocracking is fractionated to recover a series of hydrocarbons and hydrogen and wherein the hydrogen is recycled to the hydrocracking operation.

* * * * *